United States Patent [19]

Wieland et al.

[11] 4,367,813
[45] Jan. 11, 1983

[54] MECHANISM TO CONTROL POWER CHAIN SAW CLUTCH OPERATION

[75] Inventors: Dieter Wieland, Neckarrems; Walter Merz, Auenwald, both of Fed. Rep. of Germany

[73] Assignee: Andreas Stihl, Waiblingen, Fed. Rep. of Germany

[21] Appl. No.: 8,976

[22] Filed: Feb. 2, 1979

Related U.S. Application Data

[63] Continuation of Ser. No. 776,750, Mar. 11, 1977, abandoned.

[51] Int. Cl.³ .............................................. B60K 41/24
[52] U.S. Cl. .................................. 192/17 R; 56/11.3; 192/48.5
[58] Field of Search ........... 192/17 R, 17 A, 105 CD, 192/48.5, 48.1, 70.22; 56/11.3

[56] References Cited

U.S. PATENT DOCUMENTS

| | | | |
|---|---|---|---|
| 3,785,465 | 1/1974 | Johansson | 192/48.5 |
| 3,958,680 | 5/1976 | Armbruster | 192/48.5 |
| 4,140,209 | 2/1979 | Muller | 192/17 R |

Primary Examiner—George H. Krizmanich
Attorney, Agent, or Firm—Becker & Becker, Inc.

[57] ABSTRACT

A power saw, especially power chain saw, in which a sprocket wheel is driven by a motor through the intervention of an intermediate clutch acting as safety clutch, and which comprises a control member for disengaging the intermediate clutch. The control member is by means of an actuating member returnable to its ineffective position. The power saw furthermore comprises a follower member which is movable from an engaged position to a disengaged position and vice versa for respectively connecting and disconnecting the clutch elements of the intermediate clutch. The power saw also includes a clutch with a clutch drum and also has a brake member cooperating with the clutch drum. The brake member is designed as brake band and is looped around the clutch drum. The control member and the brake band have one end mounted on a common holding element which latter by means of the actuating member and against the thrust of a spring is held in its rest position and by the force of the spring is movable into a disengaged position for releasing the brake band and for disengaging the control member.

14 Claims, 12 Drawing Figures

MECHANISM TO CONTROL POWER CHAIN SAW CLUTCH OPERATION

This is a continuation of application Ser. No. 776,750, filed Mar. 11, 1977 now abandoned.

The present invention relates to a motor saw, especially a motor chain saw, with a driving sprocket wheel for the saw chain, which sprocket wheel is adapted by a motor to be driven through the intervention of an intermediate clutch provided as safety clutch. The motor saw is provided with a shifting member for disengaging the intermediate clutch, said shifting member being adapted by an actuating element to be moved into its disengaging position. The motor saw furthermore comprises a follower member movable between a disengaged and engaged position, for connecting the clutch elements of the intermediate clutch with a further clutch which is operable to shift in conformity with the speed and includes a clutch drum adapted to cooperate with a brake member. With this motor saw which is disclosed in U.S. Pat. No. 3,991,864, the control or shift member is through a carrier and a holder mechanically rigidly connected to the actuating member. The brake member is designed as brake shoe which is connected to the holder of the control member. For purposes of disengaging the safety clutch, the actuating element is pivoted while the control member is returned to its starting position, and while the follower member is moved into its disengaged position. Immediately after the disengaged position has been obtained, the brake member is by means of the control member moved against a wedge-shaped surface connected to the housing. This wedge-shaped surface is curved concavely and extends in the direction of rotation of the brake shoe in the direction toward the clutch drum. As a result thereof, during a further pivoting of the actuating member, the brake shoe is displaced along said wedge-shaped surface and thus is pressed to an even greater extent against said clutch drum.

Until the full brake effect has been realized, the brake shoe will therefore have to perform a relatively long stroke while the full braking effect is for practical purposes realized only by the servo effect, inasmuch as the brake shoe is by the actuating member pressed into the region between the clutch drum and said wedge-shaped surface and thus is to an ever greater extent pressed against the clutch drum until the latter is finally braked. With such a design, in spite of the relatively great displacement stroke of the brake shoe, a quick braking of the clutch drum to a standstill is realized. However, a certain time is required until the clutch drum comes to a full stop which results in an increase in the braking time.

It is, therefore, an object of the present invention so to further develop the motor saw according to U.S. Pat. No. 3,991,864 that the clutch drum will after disengagement of the safety clutch be braked immediately in a shock-like manner.

This object and other objects and advantages of the invention will appear more clearly from the following specification in connection with the accompanying drawings, in which:

FIG. 5a is a view similar to that of FIG. 5 and represents a section taken along line Va—Va of FIG. 4a.

The motor saw according to the invention is characterized primarily in that the brake member is designed as brake band and surrounds the clutch drum, and that the shifting or control member and the brake band have one end journalled on a common holding member which latter is by means of the actuating member and against the thrust of a spring held in its rest position, and which for releasing the brake band and for disengaging the control member is adapted by spring force to be moved into a disengaging position.

By pivoting the actuating member, the holding member is free and by spring force is moved into its disengaging position while the control member moves into its disengaging position that the power flow from the motor shaft to the driving chain wheel is interrupted and directly subsequently thereto the brake band is in engagement with the clutch drum. The holding member pivots by spring force into its disengaging position while the brake band in a shock-like manner and without a longer brake stroke and without delaying time, brakes the clutch drum in a minimum of reaction time. In this way, extremely short responsive periods can be maintained so that the person operating the motor saw will in case of danger still be better protected.

Figure 1:
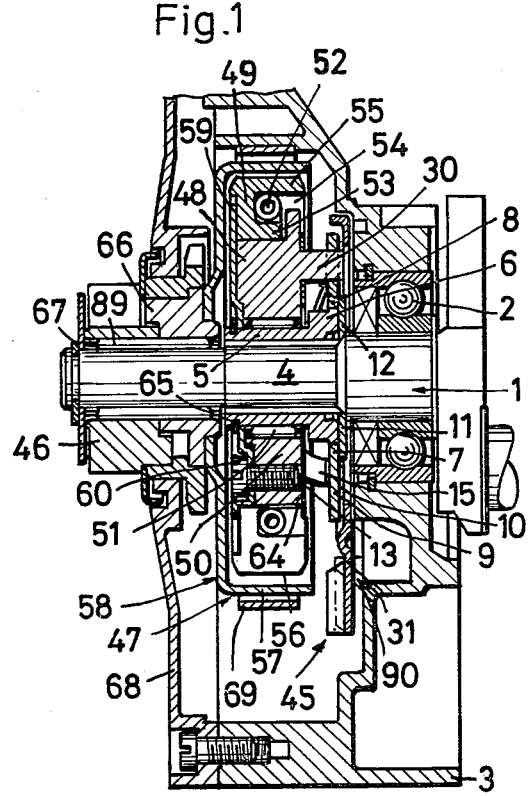
FIG. 1 represents an axial section of a driving device of a motor saw according to the invention, in conformity with which a driving sprocket wheel is located on the outside of the driving device.

Referring now to the drawings in detail, with the embodiment illustrated in FIG. 1, the motor shaft 1 of the non-illustrated motor is rotatably supported by ball bearings 2 on the housing 3 of the motor saw. Non-rotatably connected to a shaft section 4 of smaller diameter is a hub section 5 of which that end which faces the ball bearings 2 is designed as collar 6. The collar 6 is provided with outer teeth 7 meshing with the inner teeth 8 of a disc-shaped follower member 9. The bottom side 10 and 11 of the follower 9 and of the collar 6 of the hub section 5 are located in one plane. The hub section 5 rests by means of its collar 6 on a flat disc 12 which is non-rotatably connected to the crankshaft.

Figure 6:
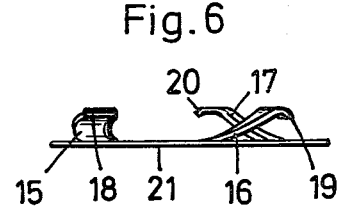
FIG. 6 is a side view of the leaf spring according to FIG. 3.

In FIG. 1, the follower member 9 is illustrated in its engaged position in which it is under the load of a spring 13. This spring is separately illustrated in FIGS. 3 and 6. Accordingly, the spring 13 is designed in the form of an annular disc and comprises a circular central opening 14 the diameter of which substantially corresponds to the diameter of the collar 6 of the hub section 5. Spring 13 is provided with three spring tongues 15, 16, 17 respectively bent out of their plane. These spring tongues are steadily curved over their length and extend coaxially with regard to the axis of said spring. The spring tongues 15, 16, 17 are evenly spaced from each other in circumferential direction of spring 13. Their free end sections 18-20 are located in a common plane which extends parallel to the plane which contains the spring 13. The end sections 18-20 are so wound in the direction toward the base body 21 of the spring that spring 13 when occupying its installed position rests with the free end sections 18-20 along its surface on the follower member 9 (FIG. 1). As a result thereof, in an advantageous manner a canting or edging of the spring tongues on the follower member 9 when under load, will be prevented so that the follower member can in a proper manner be engaged and disengaged. Since the free end sections 18-20 of the spring tongues 15-17 furthermore are located in a common plane, and since the spring tongues are evenly angularly spaced from each other, the follower member 9 will be loaded in the direction toward its engaging position (FIG. 1) and thus will assure a proper engaging and disengaging of the follower member 9 so that the intermediate clutch still to be described can in case of danger be safely disengaged.

Figure 3:
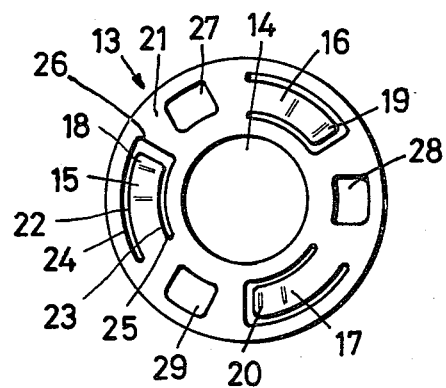
FIG. 3 is a top view of a leaf spring arranged in the driving device.
Figure 4:
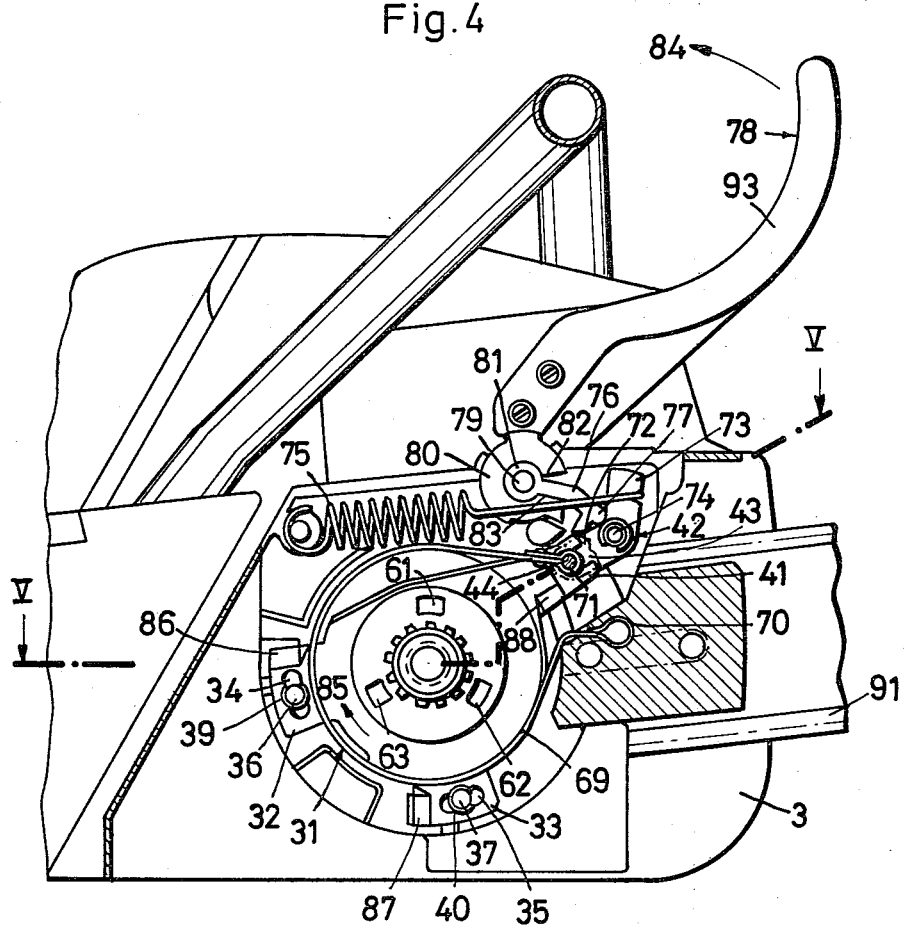
FIG. 4 is a view in the direction of the motor shaft of a portion of a motor saw according to the invention.

As has been illustrated in FIG. 3, the lateral rim portions 22 and 23 of the spring tongues 15-17 of the same length are located in the projection upon the base body 21 of spring 13 while being spaced with regard to the corresponding rim portions 24 and 25 after the openings 26 which remain in the spring base body 21 after the spring tongues have been bent out. When, therefore, the spring tongues are bent back into the plane of the base body 21, said spring tongues are located in spaced relationship to said rim portions 24 and 25 of the openings 26 so that the spring tongues will be safely prevented from jamming and remaining suspended. Between adjacent spring tongues there are respectively provided rectangular openings 27, 28, 29 which are respectively positively engaged (FIG. 1) by a holding member 30 of a centrifugal clutch which will be described furtherbelow. The follower member 9 which is held in its engaged position by the thrust of spring 13 rests during the shifting operation on a control member 31 which has the shape of a disc (FIG. 4). The follower member 9 which by means of spring 13 is held in its engaging position rests during the shifting operation on a controlling member 31 which has the shape of a disc (FIG. 4). The said control member 31 has two extensions 32 and 33 which project beyond the circumference of said control member 31 and serve as release members. In the extensions there are respectively provided slots 34 and 35 which serve as guiding means for a bolt 36, 37 which engages said slots while being fixed to the housing. The bolts 36 and 37 are respectively surrounded by a pressure spring 38 (FIG. 5) which with one end rests on the control member 31 and with its other end rests against a safety member 39, 40 which is provided at the free end of the bolt 36, 37. The control member 31 is furthermore provided with a control member 41 designed in the form of a further extension projecting over the circumference of said control member 31. The control member 41 is positively connected to a movably journalled holding member 42. To this end, the control member 41 has a slot 43 engaged by an extension member 44 which extends perpendicular to the holding member 42 and is rigidly connected therewith.

The follower member 9, the control member 31, and the spring 13 form portions of an intermediate clutch 45 (FIG. 1) which is designed as safety clutch and by means of which the power flow is conveyed from the driving shaft 1 to the driving sprocket wheel 46 on the output end of the motor shaft 1. The intermediate clutch 45 is positively connected to a centrifugal clutch 47. The centrifugal clutch 47 comprises a star-shaped carrier 48 for the centrifugal weights 49. The carrier 48 has its hub portion 50 mounted on a needle bearing 51 by means of which the centrifugal clutch is rotatably journalled on the hub section 5. The centrifugal clutch 47 has three centrifugal weights 49 which are uniformly distributed about the axis of the motor shaft 1, said centrifugal weights 49 being designed in the form of annular segments and by means of shoes 53 are slipped upon the arms of the star-shaped carrier 48. The centrifugal weights 49 are with their shoes on the carrier arms displaceable outwardly in a direction radially with regard to the motor shaft 1. All of the centrifugal weights are preloaded by an annular spring 52 in the direction toward the motor shaft 1. The annular spring 52 is arranged concentrically to the motor shaft 1 in depressions 54, and more specifically between the shoes 53 and a radially outer rim portion 55 of the centrifugal weights 49. The centrifugal weights have their circumferential surfaces provided with frictional linings 56 which have associated therewith as countersurface the inner side of a cylinder mantle shaped section 57 of a clutch drum 58 that surrounds the carrier 48 with the centrifugal weights 49. That side of the carrier 48 and of the centrifugal weights 49 which faces away from the follower member 9 has by means of screws 60 connected thereto a disc 59 in such a way that the disc and the screws do not in axial direction of the motor shaft 1 project beyond the centrifugal weights 49.

The centrifugal force coupling 47 operates in the following manner:

The follower 9 is driven by way of the motor shaft 1 and the hub part 5, 6. The follower 9 is seated or located upon the holding parts 30 of the carrier or support 48 of the centrifugal force coupling 47. Consequently the carrier 48 is likewise driven by the follower 9. The carrier 48 itself is seated rotatably by way of the needle bearing 51 upon the hub part 5. As soon as the rotational speed of the carrier 48 exceeds a predetermined limit or boundary value, the centrifugal weights 49 are moved outwardly until the centrifugal weights with the frictional linings 56 thereof engage against the inner side of the segment 57 of the coupling drum 58. Then the coupling drum 58 and accordingly the sprocket wheel 46 fixedly connected therewith are taken along thereby.

The arms of the carrier 48 are provided with holding members 30 which extend axially with regard to motor shaft 1 in the direction toward the follower member 9. By means of these holding members, the positive connection between the centrifugal clutch 47 and the intermediate clutch 45 is established. The holding members 30 engage corresponding openings 61-63 provided in the follower member 9 (FIG. 4). These openings 61-63 are advantageously designed in the same manner as the openings 27-29 in the spring 13. In the engaged position as well as in the disengaged position of the follower member 9, the holding members 30 engage these openings 61, 62, 63 so that the positive connection between the two clutches is established both when the intermediate clutch 45 is disengaged and also when the intermediate clutch 45 is engaged.

The carrier 48 with the centrifugal weights 49 is mounted so as to be non-displaceable in the axial direction of the motor shaft 1. The centrifugal clutch 47 rests by means of spring 13 on the collar 6 of the hub section 5, said spring 13 by means of its base body 21 engaging that side 64 of the centrifugal clutch which faces the follower member 9. To the other side of the carrier 48, on the hub section 5, there is connected a supporting member 65 which is non-rotatably connected to the hub section 5. The supporting member 65 is according to the illustrated embodiment formed by a circlip lock ring or Seeger ring. The carrier 48 with the centrifugal weights 49 engages said supporting part 65 by means of disc 59.

The clutch drum 58 is by means of teeth 66 non-rotatably conncted to the drive chain sprocket 46 which latter is secured against axial displacement by means of a safety member 67 mounted on the output end side of the motor shaft 1.

The entire clutch system is with the exception of the driving chain sprocket 46 covered toward the outside by means of a cover 68 which is detachably connected to the housing 3.

The clutch drum 58 is surrounded by a brake band 69 one end of which 70 is connected to the housing 3 whereas its other end 71 is connected to an entension 44 of the holding member 42. The holding member 42 is formed by a two-arm lever which has two arms 72 and 73 merging with each other in a V-shaped manner. In the bending region, the holding member 42 is by means of a bolt 74 pivotally mounted on the housing 3. With the embodiment according to FIG. 1, the ends 71 of the brake band 69 and of the control member 41 of the control element 31 are arranged on one side of the holding member 42. Of course, if desired, the end of the brake band and the control member 41 may also be rotated on one side each of the holding member 42. In such an instance, the extension 44 extends through the holding member 42. The extension member 44 is according to the described embodiment located nearly on one side of the holding member 42 and is connected to the arm 72. To the other arm 73 of the holding member 42 there is linked a tension spring 75 the other end of which is linked to a stud which is fixed to the housing. The holding member 42 is by means of a pawl 76 held in its rest position in which the brake band 69 is spaced from the clutch drum 58 and in which the control member 31 occupies its engaging position. In its rest position, the pawl 76 engages a ratchet cam 77 which is provided on the arm 73 of the holding member 42. Since the holding member 42 in its rest position is subjected to the force of the tension spring 75, and since furthermore the pawl 76 engages the ratchet cam 77, the pawl 76 cannot automatically pivot into a release position. As will be seen from FIG. 4, the pawl 76 is together with a handle 93 of the actuating member 78 pivotally mounted on a common axle 79 which is fixedly connected to the housing. The handle 39 comprises a bearing member 80 which extends in an arc-shaped way over an angle exceeding 180°. By means of said bearing part 80, the handle is mounted on the axle 79. The bearing part 80 partially surrounds the bearing part 81 of the pawl 76. The two ends 82 and 83 of the bearing part 80 of handle 93 form abutments for the pawl 76 in the disengaging and engaging position of the actuating member 78.

In order to disengage the safety clutch 45, the actuating member 78 is in a direction opposite to that of arrow 84 pivoted about the axle 79 which is arranged in spaced relationship to the bearing bolt 74 of the holding member 42. The end 82 of the bearing part will in this connection take along the pawl 76 which slides over the ratchet cam 77 and releases the holding member. Inasmuch as this holding member in its rest position is subjected to the tension of the tension spring 75, the holding member will after being released by the pawl 76 instantaneously and practically without delay be pivoted about the axis of the bolt 74 into its released position (FIG. 4). In this connection, the extension member 44 will on arm 72 likewise be pivoted while the control member 31, due to the fact that the extension member 44 engages the slot 43 in the control element 41 of the control member, be turned in the direction of the arrow 85 (FIG. 4), about the axis of the motor shaft 1. In addition to this turning movement, the control member simultaneously carries out an axial movement in the direction toward the centrifugal clutch 47. This axial displacement will be realized due to the fact that the control element 31 is provided at its release members 32 and 33 extending beyond the circumference and at the control element 41 with one control surface 86–88 each which ascends in the direction of rotation indicated by the arrow 85. Each of said control surfaces 86–88 has associated therewith a deviating member 90 which is arranged on housing 3 and is formed by an elevation in the housing 3. During the rotary movement of the control member 61 in the direction of the arrow 85, the control surfaces 86–88 move on said deviating parts of the housing whereby the control member is axially displaced against the thrust of the springs in the direction toward the centrifugal clutch 47, said spring surrounding the bolts 36,37 and the extension 44. During this axial displacement the follower member 9 designed as rigid disc and surrounding the motor shaft 1 is axially displaced to its disengaging position until the follower member 9 by means of its inner teeth 8 disengages the outer teeth 7 on collar 6. In this way, the power flow from motor shaft 1 to the drive chain sprocket 46 is interrupted which sprocket together with the clutch drum 58 is by means of a needle bearing 89 rotatably journalled on motor shaft 1. Directly following the disengagement of the intermediate clutch 45, the brake band 69 is applied to the clutch drum 58 which will then instantaneously be braked. Since during the pivoting of the holding member 42 into its release position first a disengagement of the clutch members and then a braking operation is effected, the driving means will during the braking operation not be unduly stressed, and furthermore the braking period is shortened in an advantageous manner. Since furthermore, the brake band 69 and the control disc 31 are rotatably journalled on the same holding member 42 and are from the single tension spring 75 moved into the braking position or disengaging position, extremely short reaction periods of the separating and braking mechanism are realized. It is thus possible in a minimum of time and over a minimum stroke to brake the power flow to interrupt the power flow from the motor shaft 1 to the driving chain sprocket 46 and to brake the centrifugal clutch 47.

Since the actuating member 78 is not together with the holding member 42 mounted on a common axle but on a separate axle, the actuating member will during the disengaging and braking operation not be accelerated by the tension spring 75 so that the entire energy of the tension spring will be available for the disengaging and braking operation. This likewise contributes to a considerable reduction in the reaction time during the disengagement of the intermediate clutch 45 and during the braking of the centrifugal clutch 47.

In order to re-establish power flow from the motor shaft 1, to the driving chain sprocket 46 it is necessary to pivot the actuating member 78 in the direction of the arrow 84 (FIG. 4). In this connection, the pawl 76 is by engaging the end 83 of the bearing section 80 taken along and pivots the holding member 42 against the thrust of the tension spring 75 back to its rest position. In view of the extension member 44 engaging slot 43 of the control member 41, the control member 31 turns in a direction opposite to the arrow 85 in FIG. 4. The control surfaces 86–88 are freed from the pertaining deviating members or elevations 90 on the side of the housing so that the control member 31 is by the force of the springs surrounding bolts 36, 37 and the extension member 44 of the holding member 42 displaced in axial direction to its engaging position. The follower member 9 is in this connection by the thrust of spring 13 or by the spring tongues 15–17 likewise displaced in the axial direction of the motor shaft 1 until it re-engages the hub section 5. Since during the engagement of the intermediate clutch 45, the motor shaft 1 turns, for purposes of assuring a proper engagement of the follower member 9 with the teeth 7 of the hub section 5, there is provided a synchronizing device which is formed by the supporting member 65. According to the embodiment of FIG. 1, the said supporting member 65 is formed by a Seeger ring and is non-rotatably connected to the hub section 5 and consequently rotates together with the motor shaft 1. The follower member 9 is supported on said supporting member 65 by means of the centrifugal clutch 47. The follower member 9 is therefore supported on a part which rotates together with the motor shaft 1 so that the relative velocity between the follower member 9 and the hub part 5 is relatively low. As a result thereof, between the hub section 5 and the follower member 9 there is brought about a synchronization effect by means of which a fast engagement will be made possible. The power flow from the motor shaft 1 to the driving chain sprocket 46 can therefore be established instantaneously.

Figure 2:
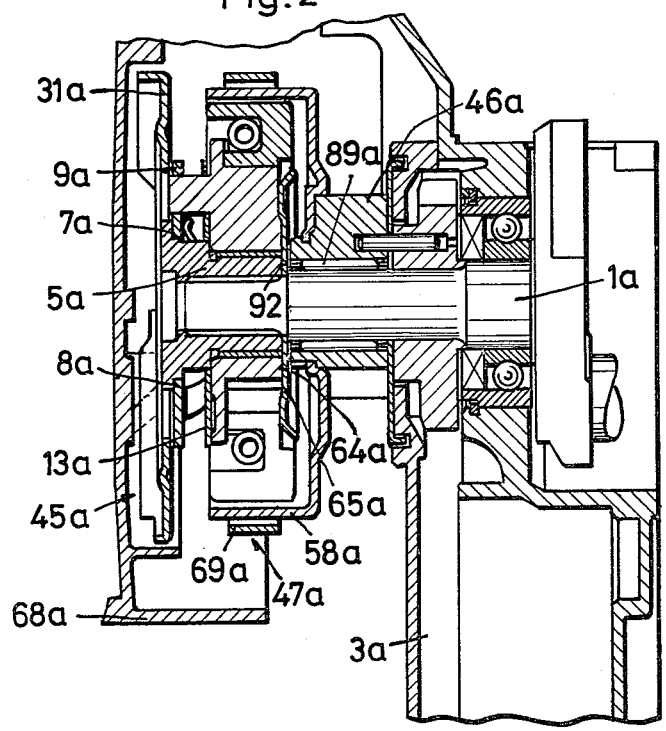
FIG. 2 represents a different embodiment of the driving device according to the invention which is similar to that of FIG. 1 with an inwardly located driving sprocket wheel.

According to the embodiment of FIG. 2, the driving chain sprocket 46 is arranged between the two clutches 45a, 47a and the housing 3. As a result thereof, the saw chain 91 which is to be passed over the driving chain sprocket 46a (only generally indicated in FIG. 4) is passed between the housing 3a and the cover 68a. The intermediate clutch 45a is arranged on the output side end of the motor shaft 1a. The follower member 9a rests on the control member 31a of the intermediate clutch 45a and by means of its inner teeth 8a meshes with the outer teeth 7a of the hub section 5a which is non-rotatably connected to the motor shaft 1a. The follower member 9a is by means of the spring disc 13a held in its engaging position. As supporting member 65a, acting as synchronizing element, there is with this embodiment a disc provided which is directly connected to the motor shaft 1a. The supporting member 65a engages an end face 92 of the hub section 5a and also engages that side 64a of the centrifugal clutch 47a which faces the housing 3a. The clutch drum 58a is non-rotatably connected to the driving chain sprocket 46a which by means of a needle bearing 89a is rotatably mounted on motor shaft 1a.

Also with this embodiment, the control member 31a and the brake band 69a are connected to the holding member 42 which can be arrested or released by the actuating member 78. The disengagement of the control member 31a and the braking of the clutch drum 58a is effected in the same manner as has been described in connection with FIG. 1. Also the engagement of the intermediate clutch 45a is effected in the same manner as described above. Since the follower member 9a is by means of the centrifugal clutch 47a supported on the disc-shaped supporting member 65a which rotates together with the motor shaft 1, the relative speed between the motor shaft 1a and the follower member 9a is relatively low so that the follower member will quickly and safely engage the hub section 5a. As a result thereof, the power flow from the motor shaft 1a to the drive chain sprocket 46a is reestablished in a minimum of time.

Figure 7:
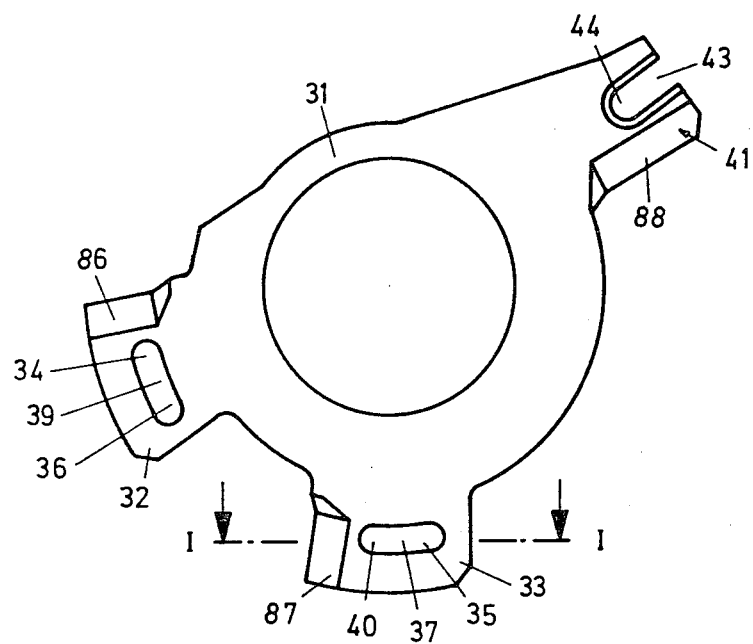
FIG. 7 is an enlarged view of a control member having features used with the motor saw of the foregoing views.
Figure 8:
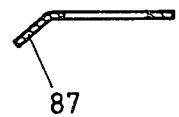
FIG. 8 is a sectional view taken along line I—I of FIG. 7.

Structural parts including the control part 41, control surfaces 86, 87 and 88 are clearly shown in FIG. 7 in which the control member 31 is shown in an enlarged view. The embodiment of the control member 31 moreover is apparent from FIG. 4 of the disclosure. The control part 41 forms an extension or attachment of the control member 31 by way of which the control member 31 is rotated during pivoting of the holding part 42 as set forth. The control surfaces 86, 87 and 88 of the control member 31 rise in rotational direction 85 (FIG. 4). FIG. 8 is a sectional view taken along line I—I in FIG. 7 to illustrate the arrangement of the control surface 87. The other control surfaces 86, 88 are correspondingly embodied. Elevations 90 are provided in the housing 3 and are located in the direction of movement of the control surfaces 86, 87 and 88 so that during rotation of the control member 31 there can occur an axial shifting. The control surfaces 86 through 88 engage upon the elevations 90 whereby the control member 31 is shifted axially during rotation as a consequence of the angled-off control surfaces 86 through 88.

The synchronization device with the embodiment of FIG. 1 is formed by the supporting member 65 and in the embodiment of FIG. 2 the synchronization device is formed by the supporting part 65a having a disc shape. The synchronization parts 65, 65a are rigidly connected with the motor shaft 1. When the follower 9 is disengaged from the collar 6 of the hub part or section 5, the follower 9 is supported by way of the centrifugal force coupling 47 relative thereto with the support part 65 rotating along with the motor shaft 1. The relative speed between the follower 9 and the hub section 5 is consequently very small or nominal. The synchronization upon engagement of the safety coupling 45, 45a is effected by the frictional moment between the follower 9, 9a and the support part 65, 65a. The relative speed between the support part and the follower is so small because of this frictional moment that the follower is taken along thereby with the motor shaft 1 rotating with the support parts 65, 65a and consequently the synchronization effect is brought about. A relative delay also arises between the follower and the hub section 5, 6 because the follower is rigidly connected with the carrier 48 of the centrifugal force coupling by way of the holding parts 30 though this carrier 48 however with the follower disengaged does not rotate along with the motor shaft 1 and the hub sections 5, 6. The carrier 48 is rotatably journalled upon the hub section 5 by way of the needle bearing 51 so that the hub section can rotate unhindered relative to the carrier 48. Consequently because of the relative speeds between the follower and the collar 6 there does not occur any immediate engagement.

The synchronization during the engagement of the intermediate clutch 45 or 45a is brought about by the friction moment between the follower member 9a and the supporting part 65, 65a. In view of this frictional moment, the relative speed between the supporting member and the follower member is considerably reduced so that the follower member is taken along by the supporting member rotating together with the motor shaft and it is in this way that the synchronization effect between these two parts is realized.

The essential features of the drive mechanism are the shiftable clutch member 9 which is driven by the shaft 4 and hub 5, 6 through teeth 7, 8, and the centrifugal clutch 48, 49, driven by the disc 9 through the lugs 30 in openings in the disc 9. The disc 9 is held in engaging drive position by spring tongues 15, 16, 17 on a member 13, and is disengaged by rotating disc 31, which is moved axially by cam members 86, 87, 88.

The centrifugal clutch engages drum 58, which drives the sprocket 46 and operates the chain saw. The drum 58 may be arrested by a brake band 69, which is contracted on drum 58 by lever 42.

A spring 75 operates lever 42 to actuate brake band 69 and through pin 44 (FIG. 5) to rotate disc 31 and disengage clutch disc 9.

The lever 42 is held against actuation during operation of the saw by a latch 76. Movement of handle 93 downwardly (FIG. 4a) rotates latch 76 to release position, thereby allowing spring 75 to actuate lever 42, instantly disengaging clutch disc 9 and engaging the centrifugal clutch drum 58 by band 69.

Figure 1A:
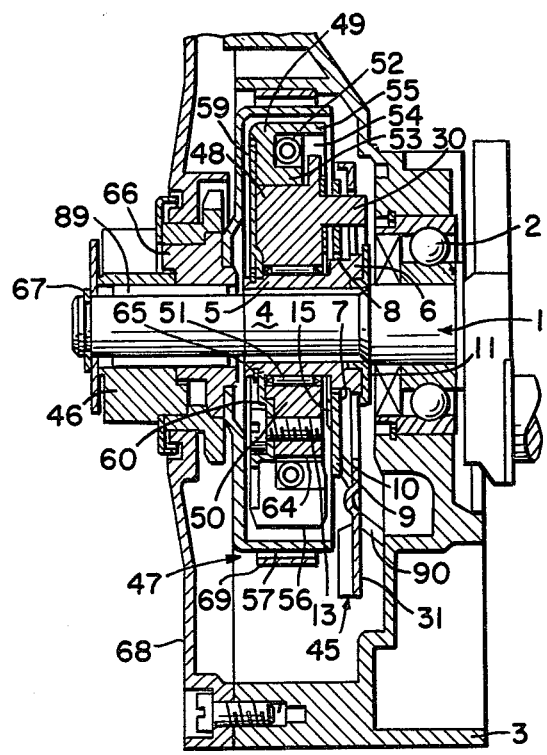
FIG. 1a is a view similar to that of FIG. 1 and shows drive mechanism details including centrifugal clutch arrangement.
Figure 2A:
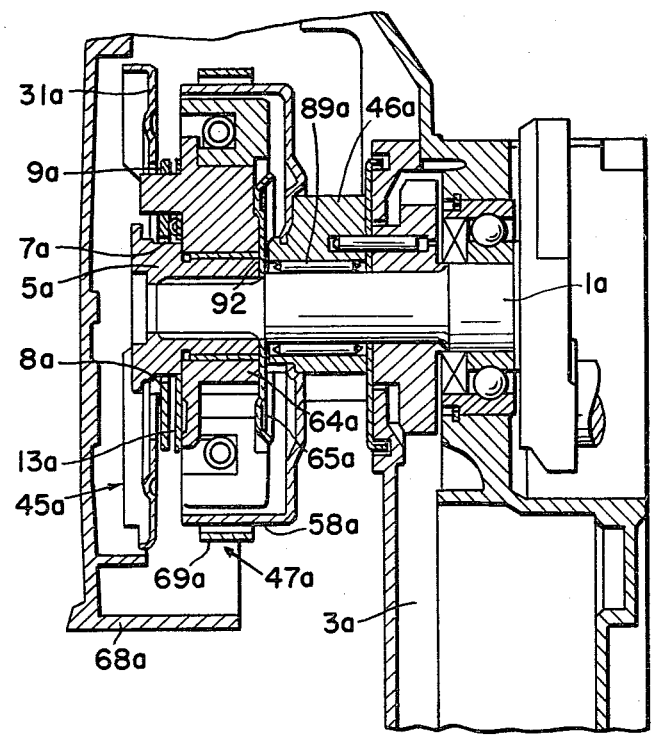
FIG. 2a is a view similar to that of FIG. 2 and shows drive mechanism details including centrifugal clutch arrangement.
Figure 4A:
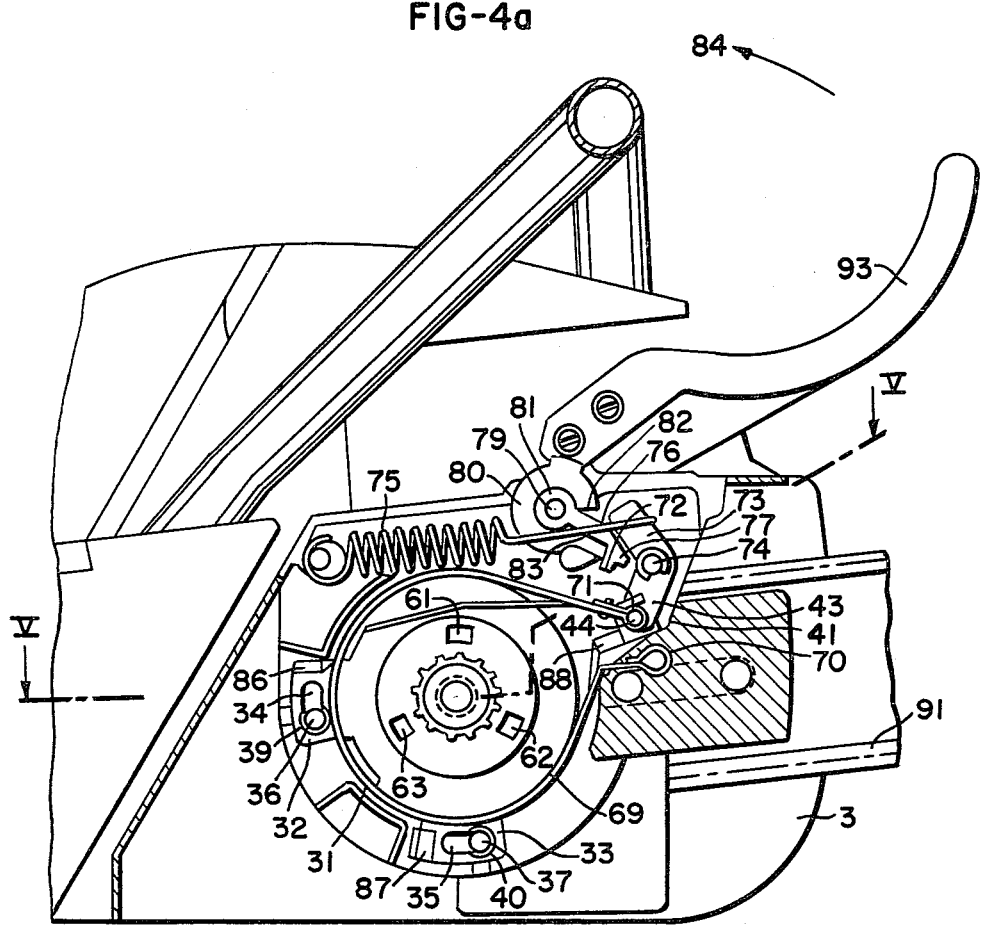
FIG. 4a is a view similar to that of FIG. 4 and shows an alternative position of lever mechanism.
Figure 5A:
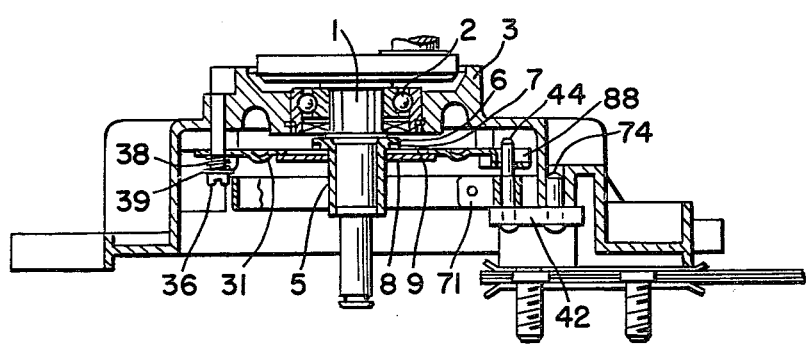

In figures filed herewith, FIG. 1a shows clutch disc 9 disengaged from hub 5, 6 and FIG. 4a shows the latch 76 in release position with the lever 42 actuated by spring 75.

The following paragraphs briefly set forth once again the manner of operation of the motor chain saw. The switching or controlling member 31 engages against the follower member 9, which has its inner teeth 8 meshing in the outer teeth 7 of the hub or collar 6 (FIG. 1). The follower member 9 is biased by the spring 13 in a direction toward engagement of the teeth. The follower member 9 has openings 61–63 (FIG. 4) into which projections or extensions located axially of the shaft 4 of the holding member 30 of the carrier 48 for centrifugal weights 49 engage (FIG. 1). The collar 6 of the hub section 5 located fixedly upon the shaft 4 engages with the inner teeth 8 of the follower member 9 by way of the outer teeth 7. Accordingly, the drive connection between the motor shaft 4 by way of the carrier 48 of the centrifugal weights 49 is established upon the driving sprocket wheel 46, which is connected rigidly with the coupling drum 58 of the centrifugal force coupling 47. As recognizable from FIG. 4, the control member 31 has a control part 41 in the slot of which an extension member 44 of the holding member 42 is shiftably engageable, which is pivotally journalled on the housing.

To disengage the safety coupling 45, the actuating member 78 is pivoted about the axis 79 counter to the direction of arrow 84. Consequently, the pawl 76 is taken along in clockwise manner and releases the holding part 42, which is pivoted counterclockwise about the axis 74 by the spring 75. As a consequence of the engagement of the extension member 44 of the holding member 42 into the slot of the control member 41, the switching or control member 31 is rotated clockwise (in the direction of arrow 85 in FIG. 4). Control surfaces 86–87 rising in the direction of rotation 85 are provided on the control member 31, and these control surfaces 86–87 run upon elevations 90 in the housing 3 (FIG. 1) during rotating of the control member 31 and thereby effecting an axial shifting of the control member 31 in a direction onto the centrifugal force coupling 47. The control member 31 accordingly is turned or rotated in a direction 85 by way of the holding member 42 and simultaneously shifted axially as a consequence of the control surfaces 86–88 and the diverting parts or elevations 90. During the axial shifting of the control member 31, there is also shifting of the follower member 9 engaging upon the control member (FIG. 1) against the force of spring 13 axially in a direction onto the centrifugal weight coupling 47. Accordingly, the inner teeth 8 of the follower member 9 disengage from the outer teeth 7 of the collar 6 of the hub section 5. During this axial shifting, the follower member 9 is guided onto the axial projections or extensions of the holding member 30 of the centrifugal weight carrier 48. When the follower member 9 is disengaged from the collar 6 of the hub section 5, the drive connection is interrupted between the motor shaft and the driving sprocket wheel 46. The hub section 5 rigidly seated upon the shaft 4, however, is driven further, though no transfer of torque from the hub section 5 onto the centrifugal weight carrier 48, which is seated rotatably with the needle bearing 51 upon the hub section 5, can occur as a consequence of the disengagement of the follower member 9. During counterclockwise pivoting of the holding member 42, the brake band 69 simultaneously engages the coupling 58 because the brake band is fastened with its end on the extension piece 44 of the holding member 42. In this manner, in case of danger the saw chain 91 (FIG. 4) guided over the driving sprocket wheel 46 is momentarily stopped.

Figure 5:
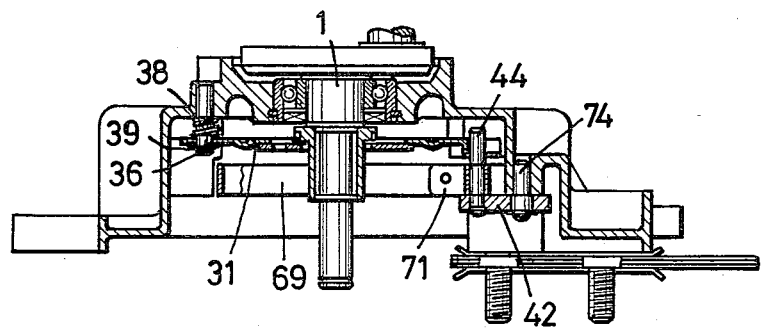
FIG. 5 represents a section taken along the line V—V of FIG. 4.

To again engage the safety coupling 45, the actuating member 84 is pivoted out of the position according to FIG. 4 in the direction of arrow 84 whereby the holding member 42 is pivoted clockwise about the axis 74 against the force of spring 75 by way of the pawl 76. As a consequence of the engagement of the extension piece 44 in the slot of the control part 41, the switching or control member 31 is rotated counterclockwise. The control surfaces 86–88 of the control member 31 accordingly disengage from the diverting parts or elevations 90 on the side of the housing. The control member 31 is then passed away from the safety coupling 45 by the force of springs 38 (FIG. 5). The follower member 9 engaging upon the control member 31 is then likewise pressed axially away from the safety coupling 45 by the force of the spring 13 and engages again with its inner teeth 8 with the outer teeth 7 of the collar 6 of the hub section 5. Then the driving connection is re-established from the shaft 4 by way of the hub section 5, the follower member 9 and the centrifugal weight carrier 48 relative to the driving sprocket wheel 46. During clockwise pivoting of the holding member 42, the brake band 69 is additionally lifted from the coupling drum 58 so that the coupling drum can rotate.

It is, of course, to be understood that the present invention is, by no means, limited to the specific showing in the drawings, but also comprises any modifications within the scope of the appended claims.

What we claim is:

1. A power saw, especially power chain saw, which includes in combination: motor means having a drive shaft, a sprocket wheel, an intermediate clutch including clutch elements interposed between and drivingly connected to said motor means and said sprocket wheel, and movable selectively from a disengaged position to an engaged position and vice versa, a housing enclosing said intermediate clutch, a control member operatively connected to said intermediate clutch and operable to selectively shift said intermediate clutch from engaged position to disengaged position and vice versa, actuating means operatively connected to said control member for selectively moving the latter from a first position in which it holds said intermediate clutch in engaged position to a second position in which said control member is held in disengaged position, a follower member movable from an effective position in which said motor means having said drive shaft is operatively connected with said sprocket wheel to an ineffective position and vice versa for respectively connecting and disconnecting said clutch elements connected to said intermediate clutch and comprising a centrifugal clutch portion having a centrifugal weight carrier and a clutch drum, a brake member operatively connected to said clutch drum, said brake member comprising a brake band looped around said clutch drum, holding means movably mounted on said housing, a said control member and said brake band having one end mounted in common on said holding means, spring means continuously urging holding means into ineffective position for disengagement of said brake band and for disengagement of said control member, means associated with said actuating means for holding said control member and said brake band in disengaged position against the thrust of said spring means, said holding means alone being effective upon said control member and said brake band in a shock-like manner relative to said clutch drum in a minimum time without delay to assure operator safety, said holding means comprising at least one extension extending in about the axial direction of said intermediate clutch and said centrifugal clutch portion, said control member and said one end of said brake band being mounted on said extensions, and a supporting member connected to said drive shaft for rotation therewith, said follower member being supported by said supporting member in axial direction of said motor shaft, said supporting member having that side thereof which faces away from said follower member in engagement with said centrifugal clutch portion, the extensions of said centrifugal clutch portion being in conformity with the speed of said motor shaft, said follower member for engagement and disengagement being shiftable by said control member directly in axial direction, said follower member doing axial shifting thereof being positively guided upon the centrifugal weight carrier of said centrifugal clutch portion.

2. A power saw according to claim 1, in which said actuating means includes locking means operable to hold said holding means in its ineffective position, said actuating means comprising a handle part and a latching part and common axle means supporting both said latching part and said handle part, said latching part being pivotable relative to said handle part.

3. A power saw according to claim 1, in which said control member is disc-shaped and which comprises at least one release member arranged on the circumference of said disc-shaped control member for moving said control member to its disengaging position, a deflecting member arranged in the path of movement of said release member, said release member being provided on said housing, at least one of said release and deflecting members having a control surface ascending in the direction of rotation of said control member.

4. A power saw according to claim 1, in which said holding means is designed as a two-arm lever having one arm provided with said extension for said brake band and said control member and which includes a tension spring connected to said other arm.

5. A power saw according to claim 4, in which one of said two arms of said holding means is provided with a blocking member, said latching part of said actuating means when occupying its latching position engaging said latching part.

6. A power saw, especially power chain saw, which includes in combination: motor means having a drive shaft, a sprocket wheel, and intermediate clutch including clutch elements interposed between and drivingly connected to said motor means and said sprocket wheel, and movable selectively from a disengaged position to an engaged position and vice versa, comprising: a follower member movable from an effective position in which said motor means having said drive shaft is operatively connected with said sprocket wheel to an ineffective position and vice versa for respectively connecting and disconnecting said clutch elements of said intermediate clutch, an additional safety clutch shift member positively connected to said intermediate clutch, and a supporting member connected to said drive shaft for rotation therewith, said follower member being supported by said supporting member in axial direction of said motor shaft.

7. A power saw according to claim 6, in which said supporting member has that side thereof which faces away from said follower member in engagement with said additional safety clutch shift member having effectiveness of in conformity with the speed of said motor shaft.

8. A power saw according to claim 6, in which said supporting member is located between said additional safety clutch shift member and said sprocket wheel.

9. A power saw according to claim 8, in which said follower member includes a leaf spring continuously urged into its engaging position.

10. A power saw according to claim 9, in which leaf spring comprises at least two spring tongues angled out of the plane of said leaf spring, said tongues engaging said follower member, the free end sections of said spring tongues being located in a common plane extending parallel to the plane of the non-angle-off portion of said leaf spring.

11. A power saw according to claim 10, in which said spring tongues are curved throughout their length and extend coaxially with regard to the axis of said leaf spring.

12. A power saw according to claim 10, which includes holding means for said additional safety clutch shift member and being provided with openings for said holding means, said openings being located between said spring tongues.

13. A power saw according to claim 9, in which said follower member is supported by a supporting member rotatably connected to said motor shaft and in which that side of said leaf spring which faces away from said supporting member engages said additional safety clutch shift member.

14. A power saw according to claim 6, in which said follower member is designed as a rigid disc flatly engaging said control member.

* * * * *